United States Patent [19]

Suzuki

[11] Patent Number: 5,502,485
[45] Date of Patent: Mar. 26, 1996

[54] CAMERA WHICH COMPRESSES DIGITAL IMAGE DATA IN CORRESPONDENCE WITH THE FOCUS CONTROL OR THE STOP VALUE OF THE CAMERA

[75] Inventor: Masahiro Suzuki, Kawasaki, Japan

[73] Assignee: Nikon Corporation, Tokyo, Japan

[21] Appl. No.: 264,471

[22] Filed: Jun. 23, 1994

[30] Foreign Application Priority Data

Jun. 23, 1993 [JP] Japan ................................... 5-174653

[51] Int. Cl.$^6$ .................................................. H04N 5/76
[52] U.S. Cl. ......................... 348/231; 348/906; 348/354
[58] Field of Search .................................. 348/222, 232, 348/231, 233, 345, 347, 349, 354, 355, 208; 358/909.1, 906; H04N 5/76

[56] References Cited

U.S. PATENT DOCUMENTS 5,065,246  11/1991  Takemoto et al. ................... 348/232
5,274,457  12/1993  Kobayashi et al. .................. 348/233
5,369,436  11/1994  Kawakami et al. .................. 348/355

*Primary Examiner*—James J. Groody
*Assistant Examiner*—Jeffrey S. Murrell

[57] ABSTRACT

A camera in which the compressibility of digital image data is controlled by a focus signal. The camera includes an imaging device and a photographic optical system which forms a subject image on the imaging device, the imaging device converting the subject image into electrical signals. A focus detection device is coupled to the photographic optical system and focuses the photographic optical system. The focus detection device also provides a corresponding focus output signal. An analog-to-digital conversion unit receives the electric signals from the imaging device and converts the electric signals into digital signals. A compression unit receives the digital signals from the analog-to-digital conversion unit and the focus output signal from the focus detection device and compresses the digital signals at a compressibility corresponding to the focus output signal.

29 Claims, 4 Drawing Sheets

CAMERA WHICH COMPRESSES DIGITAL IMAGE DATA IN CORRESPONDENCE WITH THE FOCUS CONTROL OR THE STOP VALUE OF THE CAMERA

BACKGROUND OF THE INVENTION

1. Field of the Invention

The present invention relates to data compression and, more particularly, to data compression provided as a function on a digital still video camera.

2. Description of the Related Art

Conventional digital still video cameras conduct photographing of still pictures using a solid state imaging device, such as a CCD sensor, and store the obtained photographic image data on a semiconductor memory card. In order to provide effective utilization of the memory card, the image data is usually compressed.

FIG. 5 is a block diagram which illustrates a configuration of a conventional digital still video camera. In FIG. 5, a photographic lens 501, which is generally a group of lenses, conducts image formation of the subject image. Light from the subject passes through an aperture 502 and a mirror optical system 503 designed to introduce the subject light into a photometric part 516, such as a photometer, and range finding device (not illustrated). Photometric part 516 and the range finding device provide exposure control and focus control, respectively. After passing through mirror optical system 503, the light from the subject passes through a shutter 504. An imaging part 505 converts the subject light into electric signals and outputs image signals. Imaging part 505 includes a solid state imaging device (not illustrated) such as a CCD sensor.

A/D converter 506 receives the image signals from imaging part 505 and converts the image signals into digital signals. A signal processor 507 receives the digital signals from A/D converter 506 and conducts constant signal processing. Such signal processing can include white balance correction, amplification, g correction, and profile highlighting. A buffer memory 508 temporarily stores the image signals which have been processed by signal processor 507. A compression circuit 509 compresses the image data and memory card 510 stores the compressed image data.

Control part 520, generally a microprocessor, controls all photographic operations. Lens 501, aperture 502, mirror optical system 503, shutter 504, imaging part 505, A/D converter 506, signal processor 507, buffer memory 508, compression circuit 509, memory card 510 and photometric part 515 are electrically connected to control part 520. A focus detector 515 is also electrically connected to control part 520. Computation for focusing and optimum exposure is conducted by control part 520 based on signals received from focus detector 515 and photometric part 516. The driving of lens 501, aperture 502 and shutter 504 is controlled based on the computation results. In this manner, automatic focusing and automatic exposure are conducted.

The degree of compression (that is, the compressibility) of the image data in compression circuit 509 is preselected by a manual switch (not illustrated). The photographer selects the desired compressibility by using this manual switch.

A conventional camera as described in FIG. 5 is complex to operate since it requires the manipulation of a manual switch to select the compressibility of the data. Moreover, this selection must be performed prior to photographing. This manual operation is contrary to current trends in camera operation to reduce camera operating procedures and simplify camera use for the photographer.

In order to eliminate the use of a manual switch, there are camera designs in which the digitized image data stored in buffer memory 508 is analyzed and the compressibility automatically determined. Other designs optimize compressibility by partially extracting image data from buffer memory 508, compressing the extracted image data, conducting feedback of the results, and repeating the compression.

However, in either of these cases, rapid photographing cannot be conducted because a relatively long time is required to calculate the optimum compressibility. In addition, a relatively large amount of electric power is consumed since the electric power consumed is proportional to the operation of the compression circuit.

SUMMARY OF THE INVENTION

Accordingly, it is an object of the present invention to provide a digital still video camera which is able to automatically obtain the compressibility of the image data in a relatively short time while using a relatively small amount of electric power.

It is also an object of the present invention to provide a camera in which the compressibility of image data corresponds to the focus of the subject image.

It is a further object of the present invention to provide a camera in which the compressibility of image data corresponds to the stop value of the camera stop mechanism.

Additional objects and advantages of the invention will be set forth in part in the description which follows and, in part, will be learned from the description or by practice of the invention.

The foregoing objects of the present invention are achieved by providing a camera comprising an imaging device, a photographic optical system which forms a subject image on the imaging device, the imaging device converting the subject image into electrical signals, a focus detection device, coupled to the photographic optical system, which focuses the photographic optical system and provides a corresponding focus output signal, an analog-to-digital conversion unit which receives the electric signals from the imaging device and converts the electric signals into digital signals, and a compression unit which receives the digital signals from the analog-to-digital conversion unit and the focus output signal from the focus detection device and compresses the digital signals at a compressibility corresponding to the focus output signal.

The foregoing objects of the present invention are also achieved by providing a method of compressing data, the method comprising the steps of forming a subject image, focusing the subject image and providing a corresponding focus signal, converting the subject image into analog electrical signals, converting the analog electrical signals into digital signals, and compressing the digital signals at a compressibility corresponding to the focus signal.

The foregoing objects of the present invention are further achieved by providing a camera for photographing a subject, the camera comprising a photographic unit which uses incident light to photograph the subject by forming a subject image and provides corresponding digital image data as an output, a stop mechanism, coupled to the photographic unit, which has a stop value and controls the quantity of incident light available to the photographic unit in correspondence with the stop value, a compression unit which receives the digital image data from the photographic unit and compresses the digital image data according to a compressibility coefficient, and a compressibility control unit which controls the compressibility coefficient of the compression unit based on the stop value of the stop mechanism.

The objects of the present invention are still further achieved by providing a method of compressing data in a camera, wherein a subject image is formed from incident light, the method comprising the steps of stopping the incident light available for the formation of a subject image, the stopping being based on a stop value, forming the subject image, providing digital image data representing the subject image, and compressing the digital image data according to the stop value.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
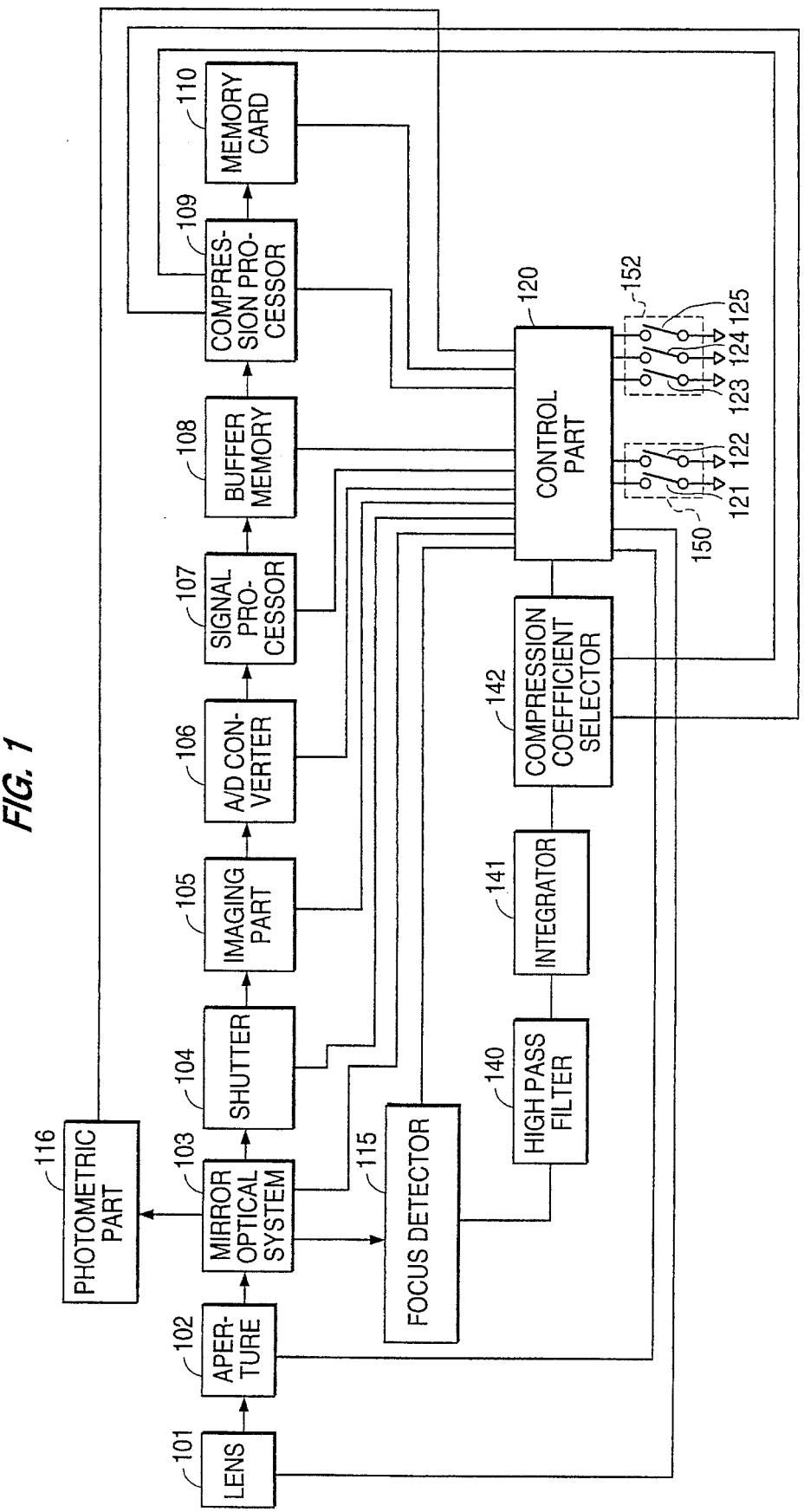
FIG. 1 is a block diagram of a digital still video camera according to an embodiment of the present invention.

Reference will now be made in detail to the present preferred embodiments of the present invention, examples of which are illustrated in the accompanying drawings, wherein like reference numerals refer to like elements throughout.

FIG. 1 is a block diagram of a digital still video camera according to an embodiment of the present invention.

Referring now to FIG. 1, a photographic lens 101, which is generally a group of lenses, conducts image formation of the subject image. Light from the subject passes through an aperture 102 and a mirror optical system 103 designed to introduce the subject light into a photometric part 116, such as a photometer, and range finding device (not illustrated). Photometric part 116 and the range finding device are used to provide exposure and focus control. After passing through mirror optical system 103, the light from the subject passes through a shutter 104. An imaging part 105 converts the subject light into electric, analog imaging signals and includes a solid state imaging device (not illustrated). Such a solid state imaging device is typically a CCD sensor.

A/D converter 106 receives the image signals from imaging part 105 and converts the image signals into digital signals. Imaging part 105 and A/D converter 106 can be combined into a single imaging and digitizing device which converts the subject image into digital signals. A signal processor 107 receives the digital signals from A/D converter 106 and conducts constant signal processing. Such signal processing can include white balance correction, amplification, g correction, and profile highlighting. A buffer memory 108 temporarily stores the image signals which have been processed by signal processor 107. A compression circuit 109 compresses the image data and memory card 110 stores the compressed image data.

Control part 120, generally a microprocessor, controls all photographic operations. Lens 101, aperture 102, mirror optical system 103, shutter 104, imaging part 105, A/D converter 106, signal processor 107, buffer memory 108, compression processor 109, memory card 110, and photometric part 116 are electrically connected to control part 120. A focus detector 115 is also electrically connected to control part 120. Computation for focusing and optimum exposure is conducted by control part 120 based on signals received from focus detecting part 115 and photometric part 116. The driving of lens 101, aperture 102 and shutter 104 is controlled based on the computation results. In this manner, automatic focusing and automatic exposure are conducted.

Figure 5:
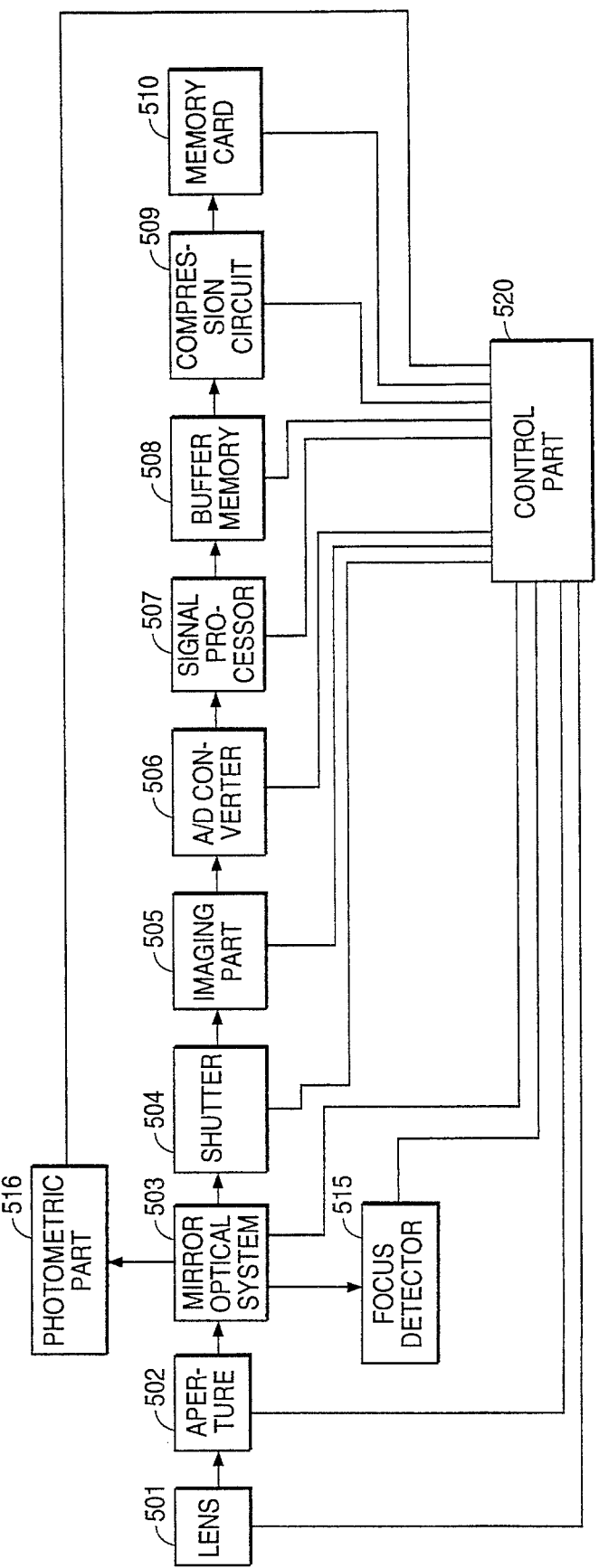
FIG. 5 (Prior Art) is a block diagram of a conventional digital still video camera.

In contrast to the conventional digital still video camera illustrated in FIG. 5, compression processor 109 conducts data compression at a compressibility corresponding to output signals of focus detector 115.

Compression processor 109 performs well-known quantized calculation and code allocation for the digital image data received from buffer memory 108 and accordingly compresses the image data. Compression processor 109 has plural quantization tables for quantization calculations. Specifically, in a preferred embodiment, compression processor 109 has three quantization tables which correspond to three compression coefficients, respectively. Each compression coefficient corresponds to the relative compressibility of the image data. The three compression coefficients include a low compression coefficient (L), medium compression coefficient (M) and a high compression coefficient (H).

The camera illustrated in FIG. 1 includes an "image quality priority mode" and a "data length priority mode". Image quality priority mode represents a mode in which the image data is compressed so as to be accommodated on memory card 110, while maintaining the highest image quality of the subject image possible under the limitations imposed by memory card 110. In the image quality priority mode, the playback image is made to be of high image quality and, preferably, relatively unchanged from the subject image. Accordingly, in the image quality priority mode, the compression coefficient is selected to be relatively low and the image is stored in memory card 110. In image quality priority mode, the data length of the image data is not fixed. By contrast, the "data length priority mode" represents a mode in which the image data is compressed to be in a format where the data length of image data is fixed for each image plane. The "fixed data length" compressed image data is stored in memory card 110. In data length priority mode, the image is not compressed with the intention of maintaining high image quality (as compared to the "image quality priority mode"), but with the intention of maintaining the fixed data length.

As shown in FIG. 1, a high pass filter 140 only allows passage of signals possessing frequency components above a certain fixed value among the output signals of the photoelectric conversion element of focus detector 115. An integrator 141 integrates the output of high pass filter 140. A compression coefficient selector 142 receives the output of integrator 141 and conducts compression coefficient selection based on the output signals of integrator 141. Compression processor 109 then conducts compression of the image data based on the output signals from compression coefficient selector 142.

FIG. 1 also illustrates various switches connected to control part 120. A release switch unit 150 includes a half-push switch 121 and a full-push switch 122. A compression mode selection unit 152 includes a compression mode selection switch 123 and compression coefficient selection switches 124 and 125.

Figure 2:
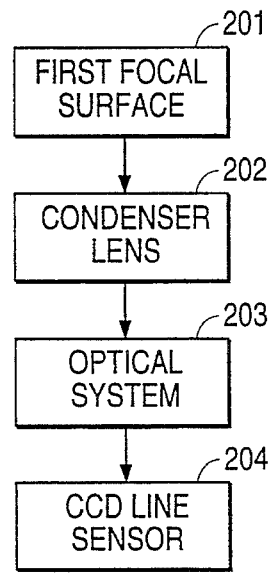
FIG. 2 is a block diagram of a range finding device according to an embodiment of the present invention as provided in a digital still video camera according to an embodiment of the present invention.

FIG. 2 illustrates a configuration of a conventional focus detector 115. As shown in this FIG. 2, light from mirror optical system 103 (see FIG. 1) undergoes subject image formation on a first focal surface 201. Light from a selected portion (generally, a central portion of the subject area) of the subject image is passed through a condenser lens 202 and optical system 203 and strikes a photoelectric conversion element (not illustrated) of a CCD line sensor 204. Output signals from the photoelectric conversion element of CCD line sensor 204 are then input to control part 120 for purposes of focus computation. Output signals from the photoelectric conversion element of CCD line sensor 204 are also input to high pass filter 140.

High pass filter 140 only allows passage of signals possessing frequency components above a certain fixed value. Signals which pass through and are output from high pass filter 140 are input to integrator 141. Based on commands from control part 120, integrator 141 integrates the signals output from high pass filter 140 at a specific time for each image plane. Integrator 141 outputs the results of the integration as voltage values. The output of integrator 141 is input to compression coefficient selector 142.

Figure 3:
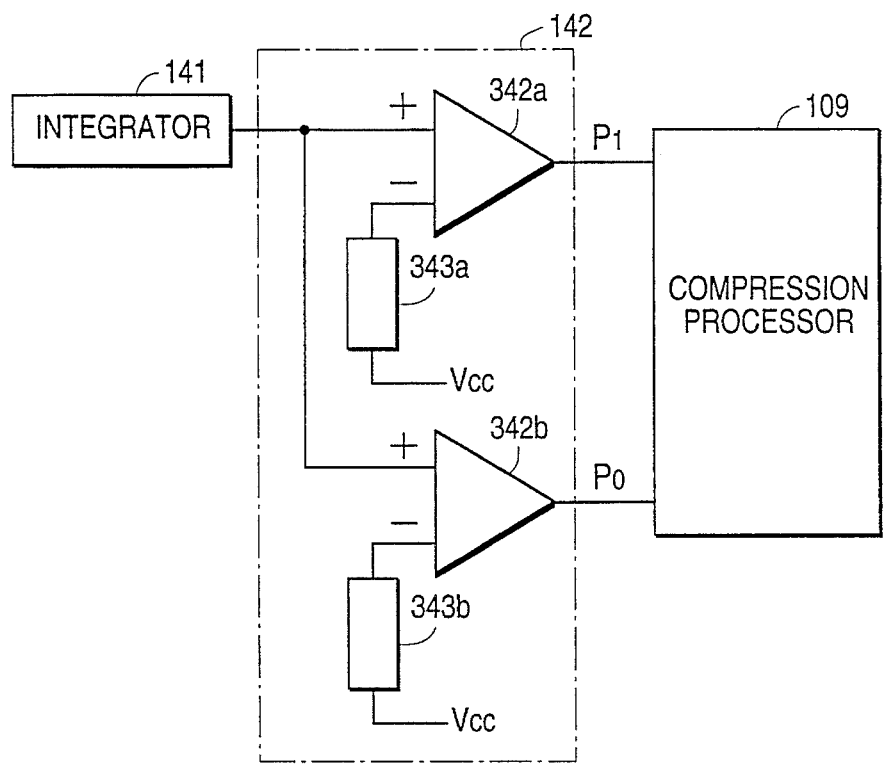
FIG. 3 is a block diagram of a compression coefficient selector according to an embodiment of the present invention as provided in a digital still video camera according to an embodiment of the present invention.

The configuration of compression coefficient selector 142 is shown in FIG. 3. Referring now to FIG. 3, compression coefficient selector 142 includes two comparators 342a and 342b and two voltage generators 343a and 343b. Voltage generators 343a and 343b are connected to comparators 342a and 342b, respectively. Voltage generators 343a and 343b generate voltage A(V) and voltage B(V), respectively, from the standard voltage $V_{cc}$ of the camera. Voltage A(V) is greater than voltage B(V).

The output voltage $V_Y$ of integrator 141 is input to the positive terminal of comparator 342a and voltage A(V) from voltage generator 343a is input to the negative terminal of comparator 342a. Similarly, the output voltage $V_Y$ of integrator 141 is input to the positive terminal of comparator 342b and voltage B(V) is input to the negative terminal of comparator 342b. The outputs of the comparators 342a and 342b are respectively provided to the input ports $P_1$ and $P_0$ of compression processor 109. Compression processor 109 conducts compression of the image data by a compression coefficient corresponding to the state of input ports $P_1$ and $P_0$.

When image quality priority mode is selected, in a situation where the output voltage $V_Y$ of integrator 141 and the standard voltage A(V) are in a relationship where $V_Y > A(V)$ (there are many high frequency components of the image signal), the state of input ports $P_1/P_0$ become High/High. In this case, compression processor 109 conducts compression by a low compression coefficient L, indicating low compressibility.

When image quality priority mode is selected, in a situation where $A(V) \geq V_Y \geq B(V)$, the state of input ports $P_1/P_0$ becomes Low/High and the compression processor 109 conducts compression by a medium compression coefficient M, indicating medium compressibility.

When image quality priority mode is selected, in a situation where $B(V) > V_Y$ (there are a relatively small number of high frequency components of the image signal), the state of input ports $P_1/P_0$ becomes Low/Low and compression processor 109 conducts compression by a high compression coefficient H, indicating high compressibility.

Therefore, for example, in image quality priority mode, the compressibility is selected to be lower as the output voltage $V_Y$ of integrator 141 becomes higher (that is, as the high frequency components become more numerous). As a result, image data compression is automatically conducted by relatively low compressibility for fine images where the high frequency components are numerous.

By contrast, the selection of the compression coefficient is different when the data length priority mode is selected. In data length priority mode, when the output voltage $V_Y$ of integrator 141 and the standard voltage A(V) are in a relationship where $V_Y > A(V)$ (there are many high frequency components of the image signal), the state of input ports $P_1/P_0$ become High/High. In this case, compression processor 109 conducts compression by a high compression coefficient H, indicating high compressibility.

In data length priority mode and $A(V) \geq V_Y \geq B(V)$, the state of input ports $P_1/P_0$ becomes Low/High and the compression processor 109 conducts compression by a medium compression coefficient M, indicating medium compressibility.

In data length priority mode and $B(V) > V_Y$ (there are a relatively small number of high frequency components of the image signal), the state of input ports $P_1/P_0$ becomes Low/Low and compression processor 109 conducts compression by a low compression coefficient L, indicating low compressibility.

Therefore, for example, in the data length priority mode, the compressibility is selected to be higher as the output voltage $V_Y$ of integrator 141 becomes higher (that is, as the high frequency components become more numerous). As a result, image data compression is automatically conducted by relatively high compressibility for fine images where the high frequency components are numerous.

A camera according to a present embodiment of the present invention is also operates in a "compression auto mode" and a "compression manual mode". Compression auto mode is a mode in which the compressibility is automatically determined by the compression coefficient selector 142 as described above. The compression manual mode is a mode in which the compressibility is selected by a switch which is manipulated by a photographer. Changing between compression auto mode and compression manual mode is conducted via compression mode selection switch 123 (see FIG. 1).

For example, if compression mode selection switch 123 is closed, the compression manual mode is set and the three types of compression coefficients (low compression coefficient L, medium compression coefficient M, and high compression coefficient H) are selected by open/close switching of compression coefficient selection switches 124 and 125 (see FIG. 1). In this manner, the image data is compressed by the compression coefficient selected by the photographer.

By contrast, if compression mode selection switch 123 is opened, the compression auto mode is set and the compression coefficient is automatically selected by the compression coefficient selector 142.

In the compression auto mode, the selection of the image quality priority mode or the data length priority mode is performed by external operating switches. When compression mode selection switch 123 and compression coefficient selection switch 124 are both open, image quality priority mode is selected. When compression mode selection switch 123 is open and compression coefficient selection switch 124 is closed, the data length priority mode is selected.

Figure 4:
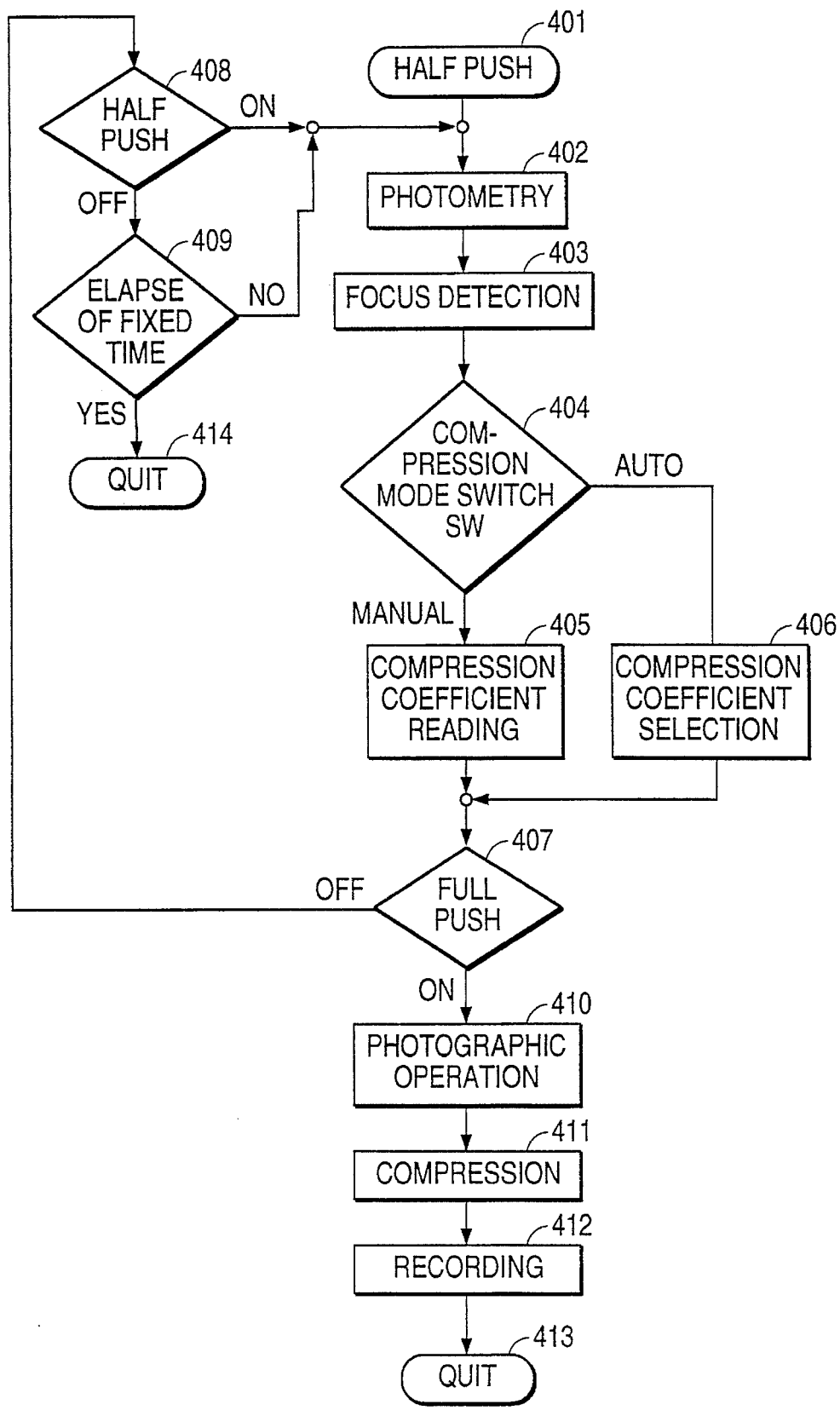
FIG. 4 is a flow chart illustrating a processing sequence of a digital still video camera according to an embodiment of the present invention.

FIG. 4 illustrates a processing sequence of a camera according to an embodiment of the present invention.

Referring now to FIG. 4, photographic operations begin in step 401 by depressing a shutter release button (not illustrated and hereinafter referred to as the "release button") to a "half-push" state. The release button preferably has two states. The first state is the half-push state where the release button is depressed half-way down and the second state is a full-push state where the release button is fully depressed. The shutter operates when the release button is in the full-push state. Half-push switch 121 (see FIG. 1) is closed when the release button is depressed to the half-push state and is open when the release button is not depressed to the half-push state. Full-push switch 122 is closed when the release button is depressed to the full-push state and is open when the release button is not depressed to the full-push state.

When the release button is depressed to the half-push state in step 401, a timer is started in step 401 and preparatory photographic operations are conducted. Such preparatory photographic operations include performing photometry and focus detection in steps 402 and 403, respectively.

In step 404, it is determined whether compression mode selection switch 123 is open or closed. If compression mode selection switch 123 is closed in step 404, the process moves to step 405 and a compression coefficient which is manually selected by the photographer is read. On the other hand, if compression mode selection switch 123 is open in step 404, the process moves to step 406 and the appropriate compression coefficient is automatically selected, as previously described.

From steps 405 and 406, the process moves to step 407 where the status of full-push switch 122 is checked. If full-push switch 122 is closed ("ON") in step 407, a series of photographic operations is conducted in step 410 since the depressing of the release button by a photographer signals the taking of a photograph. These photographic operations are well-known and include such procedures as operating the shutter and the strobe.

From step 410, the process moves to step 411 where the image data is compressed, based on the compression coefficient determined in step 405 or 406. In step 412, the pertinent image data is recorded in memory card 110 (see FIG. 1), and in step 413, photographing is terminated ("QUIT").

If full-push switch 122 is open ("OFF") in step 407, the process moves to step 408 where the status of half-push switch 121 is checked. If half-push switch 121 is closed ("ON") in step 408, the process returns to step 402. If half-push switch 121 is open ("OFF") in step 408, the process moves to step 409 where it is determined if the fixed period of time set in the timer started in step 401 has elapsed. If the time has elapsed, preparatory photographic operations (photometry and focus detection) are terminated in step 414. The timer is reset whenever half-push switch 121 is again depressed after being released.

As described above, the compression coefficient of the image data is automatically selected by compression coefficient selector 142 based on the high frequency components of the output signals from the photoelectric conversion element of focus detector 115. Therefore, it is possible to rapidly conduct the compression coefficient selection operation in comparison to conventional cameras where the compression coefficient of the image data is selected according to the properties of the image data or from the data length. In these conventional cameras, a portion of the image data is extracted before the compression processor is operated.

According to the present invention, the time from the commencement of photographic operations until the storage of the image data in memory card 110 can be made shorter than in conventional cameras and high-speed continuous photography becomes possible. Moreover, electric power is conserved since there is no need for operation of an A/D converter, buffer memory, or compression circuit for purposes of compression coefficient selection.

The above embodiments of the present invention describe "series" photographic operation with regard to "single mode" photography in which only one photograph is taken for each full-press of the release button. As for the case of "continuous mode" photography where photographs are continuously taken while the release button is fully depressed, photometry and focus detection operations are also conducted during a pertinent photographic interval. Therefore, a configuration can be adopted in which the compression coefficient is changed during the photographic interval. Additionally, the compression coefficient can be fixed during the continuous mode.

There are many different methods for the actual computation of a compression coefficient. Such computation methods are well-known. Moreover, the compression coefficient can be selected from a conventional quantized table stored in the compression processor. Appropriate values of "low", "medium" and "high" for a compression coefficient are easily recognized and determined by a person skilled in the art.

The present invention describes a digital still video camera provided with a solid state imaging device for converting the subject light into electric signals, a photographic optical system for image formation of the subject image on the imaging device, a focus detection device designed to focus the photographic optical system, an analog-digital conversion device for converting the electric signals which have been photoelectrically converted by the imaging device into digital signals, a compression device for compressing the image data which has been digitalized by the analog-digital conversion device, and a storage device for storing the image data which has been compressed by the compression device.

The embodiments of the present invention described herein pertain to a digital still video camera wherein the compression device compresses image data at a compressibility corresponding to output signals of the focus detection device.

The embodiments of the present invention also pertain to a digital still video camera wherein the compression device compresses the image data at a compressibility corresponding to the quantity of high frequency components contained in the output signals of the photoelectric conversion element of the focus detection device.

Since the compressibility of the image data is determined based on the output signals of the focus detection device, it is unnecessary to conduct switch manipulation for purposes of selecting the compressibility of the imaging data prior to photographing, as is required in conventional cameras.

Furthermore, since there is no analysis of the image data itself to determine the compressibility, and no operation of the compression device in order to determine the optimum compressibility, it becomes possible to conduct optimum compression of the photographic image data in a short time and with little electric power.

An additional embodiment of the present invention controls compression of the photographic image data based on a camera stop mechanism. In this additional embodiment, a camera for photographing a subject would include a photographic unit which photographs the subject by forming a subject image and outputting corresponding digital image data. A stop mechanism is coupled to the photographic unit and controls the quantity of incident light available to the photographic unit for forming the subject image. A compression unit receives the digital image data and compresses the digital image data according to a compressibility coefficient. Moreover, a compressibility control unit controls the compressibility coefficient of the compression unit based on the stop value of the stop mechanism. A storage unit could also be included to store the compressed image data.

In this manner, the compressibility control unit can control the compressibility coefficient so that the compressibility of the compression unit is lowered as the stop mechanism is stopped down or so that the compressibility of the compression unit is raised as the stop mechanism is stopped down.

As previously described, there are many different methods for the actual computation of a compression coefficient. Such computation methods are well-known. Moreover, the compression coefficient can be selected from a conventional quantized table stored in the compression processor. Appropriate values of the compression coefficient based on stop values can easily be determined by a person skilled in the art.

The camera could also include a mode selecting unit which selects a camera mode to be either an image quality priority mode or a data length priority mode. The compressibility control unit controls the compressibility coefficient of the compression unit according to the selected mode.

For example, the compressibility control unit controls the compressibility coefficient of the compression unit so that (a) the compressed image data maintains the quality of the subject image when the image quality priority mode is selected by the mode setting unit; (b) the data length of the compressed image data stored in the storage unit is approximately uniform when the data length priority mode is selected by the mode setting unit; (c) the compressibility of the compression unit is lowered as the stop mechanism is stopped down and the image quality priority mode is selected by the mode setting unit; and (d) the compressibility of the compression unit is raised as the stop unit is stopped down and the data length priority mode is selected by the mode setting unit.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera comprising:

an imaging and digitizing device;

a photographic optical system which forms a subject image on the imaging and digitizing device, the imaging and digitizing device converting the subject image into digital signals;

a focus detection device, coupled to the photographic optical system, which focuses the photographic optical system and provides a corresponding focus output signal; and a compression unit which receives the digital signals from the imaging and digitizing device and the focus output signal from the focus detection device and compresses the digital signals at a compressibility corresponding to the focus output signal.

2. A camera as in claim 1, further comprising a storage unit which receives the compressed digital signals from the compression unit and stores the compressed digital signals.

3. A camera as in claim 2, further comprising a mode selecting unit, wherein:

the camera is selectively operable in an image priority mode in which the digital signals are compressed so as to maintain an image quality limited by space limitations of the storage unit, and in a data length priority mode in which the data length of the compressed digital signals stored in the storage unit is fixed for each subject image, the mode selecting unit operable to select one of the image priority mode and the data length priority mode;

when the image priority quality mode is selected by the mode selecting unit, the compression of the digital signals by the compression unit is at a lower compressibility as the quantity of high frequency components indicated by the focus output signal is increased; and when the data length priority mode is selected by the mode selecting unit, the compression of the digital signals by the compression unit is at a higher compressibility as the quantity of high frequency components indicated by the focus output signal is increased.

4. A camera as in claim 1, wherein the focus output signal indicates the quantity of high frequency components in the subject image and the compression unit compresses the digital signals at a compressibility corresponding to the quantity of high frequency components indicated by the focus output signal.

5. A camera as in claim 4, wherein the focus detection unit includes a photoelectric conversion element which produces the focus output signal.

6. A camera as in claim 5, wherein the compression of the digital signals by the compression unit is at a lower compressibility as the quantity of high frequency components indicated by the focus output signal is increased.

7. A camera as in claim 5, wherein the compression of the digital signals by the compression unit is at a higher compressibility as the quantity of high frequency components indicated by the focus output signal is increased.

8. A camera as in claim 1, wherein the focus output signal contains high frequency components which indicate the quantity of high frequency components in the subject image, the camera further comprising:

a high pass filter which receives the focus output signal from the focus detection unit and produces a high pass output signal to pass the high frequency components contained in the focus output signal; and an integrator which receives the high pass output signal from the high pass filter, integrates the high pass output signal, and produces a corresponding integrated output signal;

wherein the focus output signal is indirectly received by the compression unit by first passing through the high pass filter and the integrator so that the compression unit receives the integrated output signal from the integrator.

9. A camera as in claim 1, wherein the focus output signal contains high frequency components which indicate the quantity of high frequency components in the subject image, the camera further comprising:

a high pass filter which receives the focus output signal from the focus detection unit and produces a high pass output signal to pass the high frequency components contained in the focus output signal;

an integrator which receives the high pass output signal from the high pass filter, integrates the high pass output signal, and produces a corresponding integrated output signal; and a compression coefficient selector unit which receives the integrated output signal from the integrator and selects a compression coefficient in response thereto;

wherein the focus output signal is indirectly received by the compression unit by first passing through the high pass filter, the integrator and the compression coefficient selector unit so that the compression unit receives the compression coefficient from the compression coefficient selector unit and the compression unit compresses the digital signals in accordance with the compression coefficient.

10. A camera as in claim 9, wherein the compression coefficient selector unit selects the compression coefficient to be a first compression coefficient when the integrated output signal of the integrator indicates that high frequency components contained in the focus output signal are above a first level, selects the compression coefficient to be a second compression coefficient when the integrated output signal of the integrator indicates that high frequency components contained in the focus output signal are above a second level, and selects the compression coefficient to be a third compression coefficient when the integrated output signal of the integrator indicates that the high frequency components contained in the output signal are above a third level, wherein the compressibility of digital signals by the compression unit is higher when the compression unit receives the second compression coefficient than when the compression unit receives the first compression coefficient, higher when the compression unit receives the third compression coefficient than when the compression unit receives the second compression coefficient, and higher when the compression unit receives the third compression coefficient than when the compression unit receives the first compression coefficient.

11. A method of forming compressed subject image data, the method comprising:

forming a subject image;

focusing the subject image and providing a corresponding focus signal;

converting the subject image into digital signals, the focus signal being a different signal from the digital signals and not derived from the digital signals; and compressing the digital signals at a compressibility corresponding to the focus signal.

12. A method as in claim 11, wherein the subject image contains high frequency components, the focus signal indicates the quantity of high frequency components in the subject image and the step of compressing comprises:

compressing the digital signals at a compressibility corresponding to the quantity of high frequency components indicated by the focus signal.

13. A method as in claim 11, wherein the subject image contains high frequency components and the focus signal contains high frequency components which indicate the quantity of high frequency components in the subject image, the method further comprising:

filtering the focus signal to provide a high pass output signal passing the high frequency components contained in the focus signal;

integrating the high pass output signal;

selecting a compression coefficient in response in the integrated high pass output signal; and the step of compressing includes compressing the digital signal in correspondence with the selected compression coefficient so that the compressibility indirectly corresponds to the focus signal.

14. A method of forming compressed subject image data, the method comprising:

forming a subject image;

focusing the subject image and providing a corresponding focus signal;

converting the subject image into digital signals; and compressing the digital signals at a compressibility corresponding to the focus signal, wherein the subject image contains high frequency components and the focus signal contains high frequency components which indicate the quantity of high frequency components in the subject image, the method further comprising filtering the focus signal to provide a high pass output signal passing the high frequency components contained in the focus signal, integrating the high pass output signal, selecting a compression coefficient in response in the integrated high pass output signal, and the step of compressing includes compressing the digital signal in correspondence with the selected compression coefficient so that the compressibility indirectly corresponds to the focus signal.

15. An apparatus comprising:

an imaging and digitizing device;

an optical system which forms a subject image on the imaging and digitizing device, the imaging and digitizing device converting the subject image into digital signals;

a detection device which detects information for use in forming the subject image and provides a corresponding output signal, the output signal being a separate signal from, and not derived from, the digital signals; and a compression unit which receives the digital signals from the imaging and digitizing device and the output signal from the detection device and compresses the digital signals at a compressibility corresponding to the output signal of the detection device.

16. An apparatus as in claim 15, further comprising a storage unit which receives the compressed digital signals from the compression unit and stores the compressed digital signals.

17. An apparatus as in claim 16, further comprising a mode selecting unit, wherein:

the apparatus is selectively operable in an image priority mode in which the digital signals are compressed so as to maintain an image quality limited by space limitations of the storage unit, and in a data length priority mode in which the data length of the compressed digital signals stored in the storage unit is fixed for each subject image, the mode selecting unit operable to select one of the image priority mode and the data length priority mode;

when the image priority quality mode is selected by the mode selecting unit, the compression of the digital signals by the compression unit is at a lower compressibility as the quantity of high frequency components indicated by the output signal of the detection device is increased; and when the data length priority mode is selected by the mode selecting unit, the compression of the digital signals by the compression unit is at a higher compressibility as the quantity of high frequency components indicated by the output signal of the detection device is increased.

18. An apparatus in claim 15, wherein the output signal of the detection device indicates the quantity of high frequency components in the subject image and the compression unit compresses the digital signals at a compressibility corresponding to the quantity of high frequency components indicated by the output signal of the detection device.

19. An apparatus as in claim 18, wherein the detection device includes a photoelectric conversion element which produces the output signal.

20. An apparatus as in claim 19, wherein the compression of the digital signals by the compression unit is at a lower compressibility as the quantity of high frequency components indicated by the output signal of the detection device is increased.

21. An apparatus as in claim 19, wherein the compression of the digital signals by the compression unit is at a higher compressibility as the quantity of high frequency components indicated by the output signal of the detection device is increased.

22. An apparatus as in claim 15, wherein the output signal of the detection device contains high frequency components which indicate the quantity of high frequency components in the subject image, the apparatus further comprising:

a high pass filter which receives the output signal from the detection device and produces a high pass output signal to pass the high frequency components contained in the output signal; and an integrator which receives the high pass output signal from the high pass filter, integrates the high pass output signal, and produces a corresponding integrated output signal, the output signal of the detection device being indirectly received by the compression unit by first passing through the high pass filter and the integrator so that the compression unit receives the integrated output signal from the integrator.

23. An apparatus as in claim 15, wherein the output signal of the detection device contains high frequency components which indicate the quantity of high frequency components in the subject image, the apparatus further comprising:

a high pass filter which receives the output signal from the detection device and produces a high pass output signal to pass the high frequency components contained in the output signal;

an integrator which receives the high pass output signal from the high pass filter, integrates the high pass output signal, and produces a corresponding integrated output signal; and a compression coefficient selector unit which receives the integrated output signal from the integrator and selects a compression coefficient in response thereto, the output signal of the detection device being indirectly received by the compression unit by first passing through the high pass filter, the integrator and the compression coefficient selector unit so that the compression unit receives the compression coefficient from the compression coefficient selector unit and the compression unit compresses the digital signals in accordance with the compression coefficient.

24. An apparatus as in claim 23, wherein the compression coefficient selector unit selects the compression coefficient to be a first compression coefficient when the integrated output signal of the integrator indicates that high frequency components contained in the output signal of the detection device are above a first level, selects the compression coefficient to be a second compression coefficient when the integrated output signal of the integrator indicates that high frequency components contained in the output signal of the detection device are above a second level, and selects the compression coefficient to be a third compression coefficient when the integrated output signal of the integrator indicates that the high frequency components contained in the output signal of the detection device are above a third level, and the compressibility of digital signals by the compression unit is higher when the compression unit receives the second compression coefficient than when the compression unit receives the first compression coefficient, higher when the compression unit receives the third compression coefficient than when the compression unit receives the second compression coefficient, and higher when the compression unit receives the third compression coefficient than when the compression unit receives the first compression coefficient.

25. A camera comprising:

a release switch having a half push state and a full push state;

an imaging and digitizing device;

an optical system which forms a subject image on the imaging and digitizing device, the imaging and digitizing device converting the subject image into digital signals;

a detection device which, when the release switch is in the half push state, detects information for use in forming the subject image and provides a corresponding output signal, the output signal being a separate signal from, and not derived from, the digital signals; and a compression unit which receives the digital signals from the imaging and digitizing device and the output signal from the detection device and, when the release switch is in the full push state, compresses the digital signals at a compressibility corresponding to the output signal of the detection device.

26. A camera in claim 25, wherein the output signal of the detection device indicates the quantity of high frequency components in the subject image and the compression unit compresses the digital signals at a compressibility corresponding to the quantity of high frequency components indicated by the output signal of the detection device.

27. A camera as in claim 26, wherein the detection device includes a photoelectric conversion element which produces the output signal.

28. A camera as in claim 25, wherein the output signal of the detection device contains high frequency components which indicate the quantity of high frequency components in the subject image, the apparatus further comprising:

a high pass filter which receives the output signal from the detection device and produces a high pass output signal to pass the high frequency components contained in the output signal; and an integrator which receives the high pass output signal from the high pass filter, integrates the high pass output signal, and produces a corresponding integrated output signal, the output signal of the detection device being indirectly received by the compression unit by first passing through the high pass filter and the integrator so that the compression unit receives the integrated output signal from the integrator.

29. A camera as in claim 25, wherein the output signal of the detection device contains high frequency components which indicate the quantity of high frequency components in the subject image, the apparatus further comprising:

a high pass filter which receives the output signal from the detection device and produces a high pass output signal to pass the high frequency components contained in the output signal;

an integrator which receives the high pass output signal from the high pass filter, integrates the high pass output signal, and produces a corresponding integrated output signal; and a compression coefficient selector unit which receives the integrated output signal from the integrator and selects a compression coefficient in response thereto, the output signal of the detection device being indirectly received by the compression unit by first passing through the high pass filter, the integrator and the compression coefficient selector unit so that the compression unit receives the compression coefficient from the compression coefficient selector unit and the compression unit compresses the digital signals in accordance with the compression coefficient.

* * * * *